Oct. 8, 1968     W. KAPUN     3,404,725
PRESSURE CASTING APPARATUS WITH CONTROL MEANS FOR BATCH VOLUME
Filed Jan. 26, 1966     5 Sheets-Sheet 1

INVENTOR
WALTER KAPUN
BY
ATTORNEYS

Oct. 8, 1968  W. KAPUN  3,404,725
PRESSURE CASTING APPARATUS WITH CONTROL MEANS FOR BATCH VOLUME
Filed Jan. 26, 1966  5 Sheets-Sheet 2
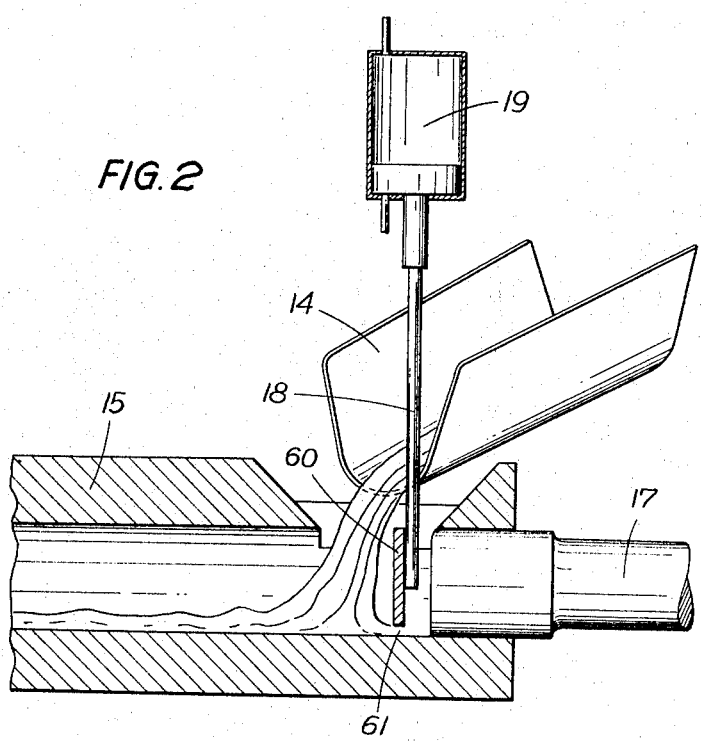
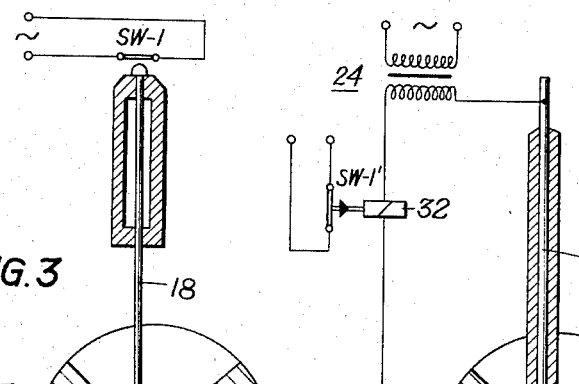
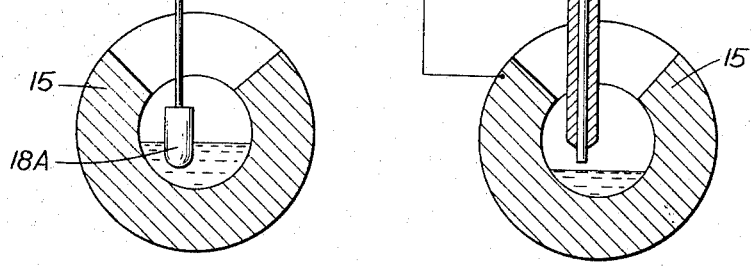
INVENTOR
WALTER KAPUN
BY
ATTORNEYS

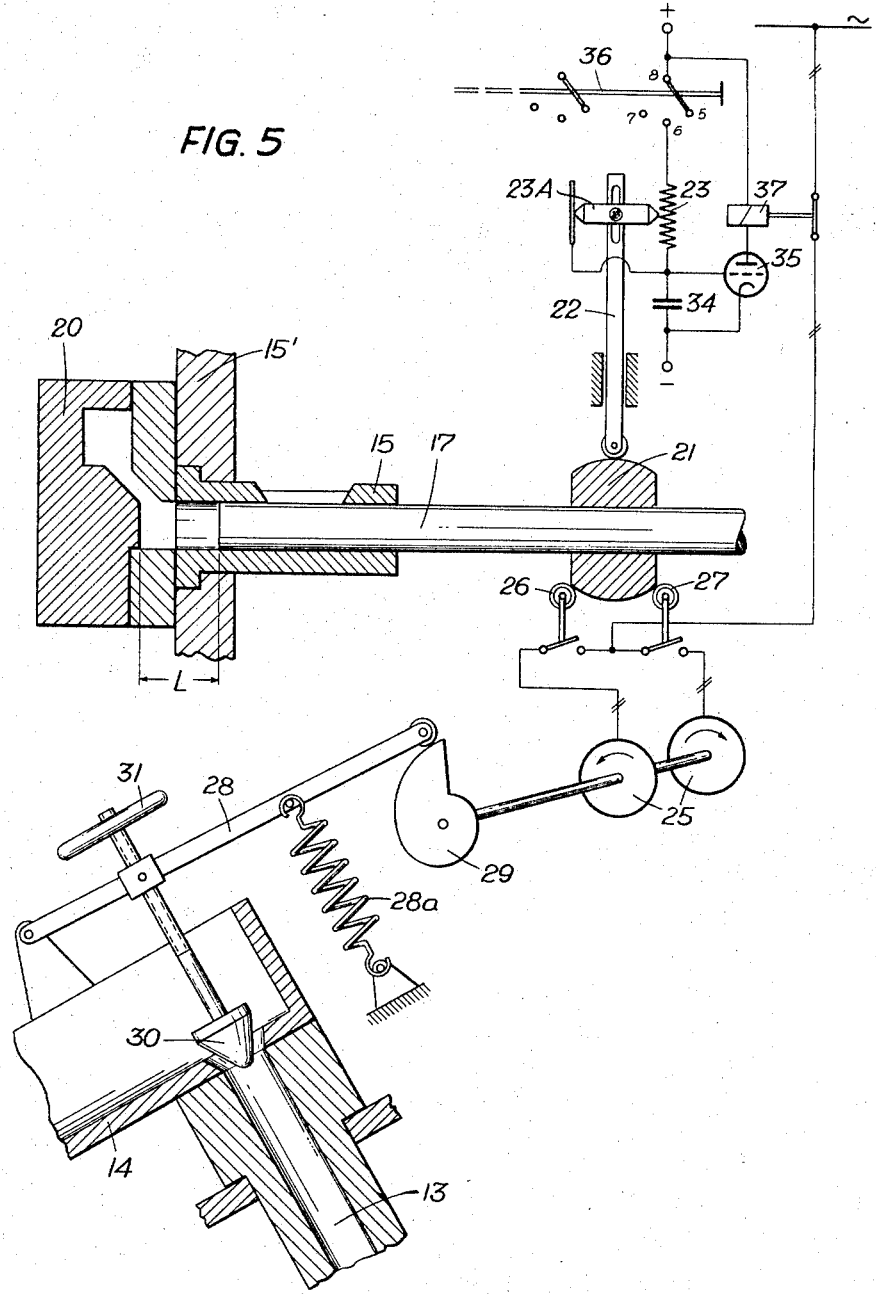

Oct. 8, 1968 W. KAPUN 3,404,725
PRESSURE CASTING APPARATUS WITH CONTROL MEANS FOR BATCH VOLUME
Filed Jan. 26, 1966 5 Sheets-Sheet 5

INVENTOR
WALTER KAPUN
BY
McGlew and Toren
ATTORNEYS

United States Patent Office 3,404,725
Patented Oct. 8, 1968

3,404,725
PRESSURE CASTING APPARATUS WITH CONTROL MEANS FOR BATCH VOLUME
Walter Kapun, Vienna, Austria, assignor to Wiener Schwachstromwerke Gesellschaft m.b.H., Vienna, Austria
Filed Jan. 26, 1966, Ser. No. 523,057
Claims priority, application Austria, Jan. 28, 1965, A 757/65
20 Claims. (Cl. 164—156)

ABSTRACT OF THE DISCLOSURE

A casting plant is disclosed as including a furnace adapted to contain molten metal and a pressure casting machine including a transfer plunger operating in a shot chamber combined with a receiving chamber and adapted to receive molten metal from the furnace. The position of the plunger at the end of its working stroke varies with the batch volume of the molten metal, and measuring means are provided for fixing the batch volume destined to be transferred to the receiving chamber. An arrangement including a discharge control valve controls transfer of molten metal from the furnace to the receiving chamber, and compensating means are associated with the measuring means to vary the volume of the succeeding batch to compensate for any deviation of the volume of a preceding batch from a preselected value.

---

This invention relates to pressure casting apparatus and, more particularly, to novel means for delivering molten metal in equal volume batches to the casting apparatus from a melting or holding furnace and operable to maintain the metered volume constant irrespective of varying operating conditions in the melting or holding furnace and in the casting machine.

Molten metal transfer apparatus of the type to which the present invention is directed constitutes a connection or link between a melting or holding furnace and a pressure casting machine, for feeding molten metal to casting molds. Such apparatus automatically feeds substantially that amount or volume of metal which is required to produce a satisfactory casting. In attempts to insure, in the production of high grade pressure castings, a uniform performance from the molten metal to the finished casting, mechanical, pneumatic and electromagnetic means have been used to feed molten metal to the casting mold or to meter the fed molten metal.

However, there are operating conditions which vary according to know functions with changes in the content of the melting or holding furnace, as well as influences which cannot be predicted as to occurrence and magnitude. The first mentioned operating conditions include the pressure acting on the surface of the molten metal bath, the metering time, the varying level of the melt or bath in the discharge chamber of the holding or melting furnace, and the electrodynamic pressure which occurs in the melting trough or loop of an induction heated furnace. The nonpredictable influences include changes in the cross section of the furnace and of its outlet due to breaking out or spalling of refractory material in the furnace lining, as well as variations in the voltage supplied to the furnace.

In pressure casting operations, it is not only desired to maintain a set, metered volume for each charge delivered to the casting apparatus, but also to provide for an easy adjustment of this volume with respect to different casting rates and to different capacities of the receiving chambers of the pressure casting machines. It is also necessary to meet metallurgical requirements in the metering operation. Thus, the molten metal must always be at the same temperature and must be free of impurities. Furthermore, there must be no time delay between the discharge of the molten metal from the melting or holding furnace and the casting operation in the casting machine. To insure that any metering device is sufficiently reliable in operation, sensing components, such as floats valves, nozzles, and contacts must not be permanently in contact with the melt or with the hot furnace atmosphere.

Among expedients proposed to meet these criteria has been a gravimetric batching device in which the volume of molten metal is weighed in a container before it is poured. In this operation, it is difficult to meet the metallurgical requirements applicable to the transfer of the metal, and the time delay between the discharge and the casting operation results in the cooling of the melt.

In another known arrangement, volumetric batching has been provided using a vessel having a predetermined volume and which is dipped into the melt. The content of the filled vessel is then poured into the receiving chamber of the casting machine. This arrangement has the disadvantage of promoting formation of oxides of molten metal, as well as the time delay between the discharge and the casting operations.

In another known metering device, the pressure gas process, based on the principle of Heron's fountain, is used for pumping the molten metal. In this latter process, the metallurgical requirements are met to a large extent but the components of the apparatus necessarily include one for sensing the changes in the level of the surface of the bath. This component is constantly in contact with the molten metal. A float which follows the level of the bath surface may be replaced by a counter, which records the discharge after each operation. However, this counter has cumulative errors after a number of casting operations, because it operates with a very great inaccuracy.

In still another known type of metering apparatus, the molten metal is drawn into the receiving chamber of the casting machine by virtue of a vacuum in the receiving chamber. However, the discharge conduit and its seal are in contact with the melt or with the hot furnace atmosphere and are unable to resist these stresses for an acceptably long period of time.

An object of the present invention is to provide a molten metal feeding apparatus which is free of the disadvantages of the mentioned prior art apparatus and others.

Another object of the invention is to provide a molten metal feeding apparatus including a control device serving for coarse batching and interrupting the supply of molten metal in response to the rise of the molten metal in the receiving chamber of the casting apparatus to a predetermined level.

A further object of the invention is to provide a molten metal feeding apparatus which includes a control device operable to determine the duration of the supply of molten metal under the control of a timer.

Yet another object of the invention is to provide a molten metal feeding apparatus including a control device for modifying a parameter which determines the amount of metal fed to the casting device in dependence on the deviation of the volume of the batch from a preselected value.

A further object of the invention is to provide metering apparatus for pressure casting machines and utilizing the stroke of the transfer plunger of the pressure casting machine to determine the deviation of the batch volume from a preselected value.

Still another object of the invention is to provide metering apparatus for controlling the flow of molten metal to pressure casting machines, and as just mentioned, and including a sensing device which operates a final control element which, by means of a converter coupled to a positioning motor, controls the outlet cross section of a discharge duct leading from the melting or holding furnace.

In a preferred embodiment of the invention, the control device interrupts the discharge of molten metal from the melting or holding furnace either when the running time of a timer has expired, or when a sensing device indicates that the molten metal in the receiving chamber of a pressure casting machine has reached a predetermined level. This interruption is effected by operating the discharge valve, which communicates with the charging and discharge chambers of the melting or holding furnace, to shut off the supply of gas under pressure and opening the venting valve, which is also associated with both chambers of the melting or holding furnace, to vent the gas under pressure from the charging and discharge chambers.

The timer includes an R-C circuit having an adjustable resistance determining the time constant, and the voltage of the capacitor is applied, as a control voltage, to an electronic switch. The resistance included in the control circuit comprises a resistor adjustable in accordance with the predetermined batch volume and, in the case of an induction-heated furnace, a series-connected further resistor serving to compensate the effect of the electrodynamic pressure on the discharge rate of molten metal. Alternatively, the resistance included in the control circuit may comprise a resistor adjustable in dependence on the stroke of the transfer plunger or a resistor which is adjustable in dependence on the level of the molten metal. A further timer may be provided to adjust this latter resistor, and this timer is activated once for each pressure casting operation to provide a stepwise adjustment of a positioning motor adjusting the slide tap of the resistor.

Yet another object of the invention is to provide, in molten metal metering apparatus of the type mentioned above, a fine control device.

In accordance with the invention, this fine control device includes, as an element for measuring the deviation of the batch volume from a predetermined magnitude, a sensing device mounted on the transfer plunger of the pressure casting machine and effective, through suitable circuitry, to provide a proportional and direction-controlled angular displacement of a positioning motor. A cam for converting the measured value is rigidly coupled to the motor shaft and has a cam surface designed in accordance with one or more operating conditions in dependence on the contents of the melting furnace. A cam follower engages this cam, and is in the form of a control lever biased against the cam surface and connected to a valve member of a control valve which is provided with a threaded end and a hand wheel for manual adjustment of the outlet cross section in accordance with the desired batch volume.

By the described connections, the positioning motor can control the cross section of the outlet of the melting furnace in a manner to compensate for any deviation of the stroke of the metal transfer plunger. When the molten metal in the receiving chamber reaches a predetermined level, the sensing means controls the flow of metal from the melting furnace, so that subsequent feeding of molten metal is then dependent on the instantaneous outlet cross section and is sensed by the sensing means on the rod of the transfer plunger. If the pouring rates is excessive, the sensing means causes the positioning motor to reduce the outlet cross section in a manner such that the following pressure casting operation is reduced in volume and the transfer plunger assumes the desired final position.

As applied to a pressure casting machine, the sensing device may comprise a cam mounted on the transfer plunger rod and formed as a solid of revolution increasing in diameter symmetrically from its end faces to the center. Cam followers are provided to engage this cam, and one of these cam followers may be mechanically connected to the adjustable tap of a potentiometer combined with a capacitor to provide a timer to cause the positioning motor to assume an angular position depending on the magnitude of the deviation. Two additional cam followers are provided and control the direction of rotation of the positioning motor in dependence on the polarity or direction of the deviation.

In further accordance with the invention, the receiving chamber of the pressure casting machine may contain a sensing element consisting of a float of heat resistant material serving to operate an associated switch, or may contain an electrode which closes a circuit upon contact with the molten metal. As the inflow of liquid results in a formation of irregular waves on the surface of molten metal in the charging chamber, it is necessary to insure that the sensing element responds to the mean liquid level. For this purpose, a heat-resistant partition is provided between the sensing element and the inflowing molten metal, and this partition leaves only a relatively small free cross section therebeneath through which the molten metal can contact the sensing element. The partition is withdrawn from the charging chamber, together with the sensing element, when the chamber supplying operation has been completed.

For an understanding of the principles of the invention, reference is made to the following description of typical embodiments thereof as illustrated in the accompanying drawings.

In the drawings:

FIG. 2 is a partial longitudinal sectional view of the receiving chamber of the pressure casting machine illustrating one form of sensing element associated therewith;

FIG. 3 is a transverse sectional view of the receiving chamber of the pressure casting machine showing a sensing element in the form of a float of heat-resistant material;

FIG. 4 is a view similar to FIG. 3 showing a sensing element in the form of an electrode arranged to contact the molten metal to complete an energizing circuit for an electrically operated switch;

FIG. 5 is a longitudinal sectional view showing the receiving chamber of the pressure casting machine with the metal transfer plunger provided with means for sensing the length of its stroke, this figure also showing the final control valve provided in the furnace discharge duct and effective to vary the outlet cross section to counteract any deviation of the batch volume from a preselected value;

Figure 1:
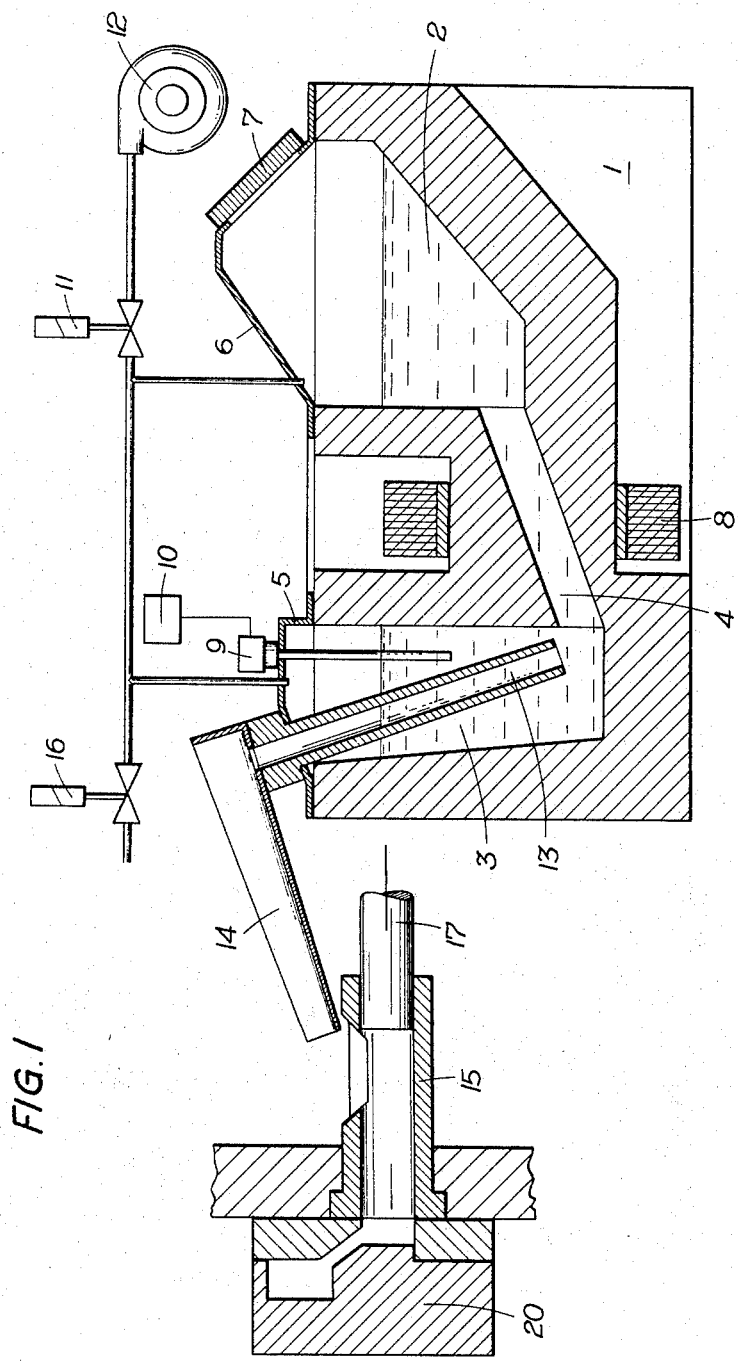
FIG. 1 is a partly schematical sectional view showing a casting arrangement to which the invention is applicable, and which comprises a metal melting furnace, having a charging chamber and a discharge chamber, and an adjacent pressure casting machine having a receiving chamber.

Referring first to FIG. 1, a two-chamber induction heating furnace 1 is illustrated as including a charging chamber 2, a discharge chamber 3 and heating channels 4. Furnace 1 is closed in a gas-tight manner by covers 5 and 6, and a cover 7 can be removed when the furnace is to be recharged. The metal in furnace 1 is induction heated by means of the transformer primary winding 8 disposed between charging chamber 2 and discharge chamber 3 and surrounding heating channels 4. The temperature of the molten metal is measured by the thermocouple 9 and a controller 10 deenergizes furnace 1 when the molten metal temperature exceeds a predetermined value, whereby to maintain the temperature at a substantially constant value.

An electromagnetically operated valve 11 controls the supply of pressurized gas to furnace 1 from a compressor 12. When valve 11 is opened, the volume in furnace 1 above the surface of the molten metal is pressurized by the gas so that the molten metal flows through a discharge pipe 13 and a transfer trough 14 into the receiving chamber 15 of a pressure casting machine generally indicated at 15', and with which is associated a mold 20. When valve 11 is closed, venting valve 16 is simultaneously opened to interrupt the flow of metal. Transfer plunger 17 then forces the molten metal from receiving chamber 15 into pressure casting mold 20.

FIG. 2 illustrates a preferred embodiment of the control system of the invention. As illustrated in FIG. 2, the system includes a sensing element 18 which interrupts supply of molten metal from the melting furnace when the metal in the receiving chamber reaches a preselected level. Sensing element 18 extends through the inlet opening of receiving chamber 15 to a level corresponding to the level of the surface of the molten metal when the desired batch volume has been attained in chamber 15. When the inflowing metal reaches this preselected level, this condition is detected by sensing element 18 which causes valves 11 and 16 to be operated to interrupt the metal flow. At the same time, a fluid pressure actuator 19 is activated to withdraw sensing element 18 from the receiving chamber, transfer plunger 17 being activated as soon as sensing element 18 has been withdrawn from the receiving chamber 15.

As mentioned above, the inflowing metal causes waves or irregularities in the surface of the metal in receiving chamber 15. It is desired that sensing element 18 sense the mean level of the molten metal. For this purpose, a heat-resistant barrier 60 is disposed in receiving chamber 15 between the inflowing metal and the sensing element 18. Barrier 60 is so disposed as to leave a free opening 61 therebeneath to allow the molten metal to flow into contact with sensing element 18. Barrier 60 is withdrawn from inlet chamber 15 simultaneously with withdrawal of sensing element 18, and this withdrawal may be effected by fluid pressure actuator 19.

FIGS. 3 and 4 illustrate different forms of sensing elements. Thus, in FIG. 3, the sensing element includes a float 18A of heat resistant material which operates the switch SW-1 in the control circuit. In FIG. 4, the sensing element comprises an electrode 18' which, upon contact with the surface of the molten metal in inlet chamber 15, closes a circuit including a secondary winding of a transformer 24 and an electromagnetic device operating switch contacts SW-1' in the control circuit. In the same manner as mentioned with respect to FIG. 2, barrier 60 is provided between the sensing elements 18A and 18' and the inflowing metal.

When the pressure is relieved in melting furnace 1, feeding trough 14 contains a certain amount of metal which enters receiving chamber 15. This metal may be described as the "last running" and its amount depends on various factors, in the same manner as does the volume of the batch of metal. The principle factors are the presure in furnace 1, the time during which the pressurized gas is supplied to furnace 1, and the volume of the space above the surface of the molten metal in furnace 1. The volume of the batch in inlet chamber 15 is further influenced by the electrodynamic pressure in the heating channels 4, the dimensions of discharge pipe 13, and the cross section, length and inclination of transfer trough 14.

To meet special requirements as to accuracy and for extreme operating conditions, it is necessary to provide a controller which will effect compensation for the influence of the "last running" metal. Such extreme conditions of operation may be due, for example, to a very long transfer trough 14, a high casting rate, and a large difference between the highest and lowest levels of metal in the furnace 1.

FIG. 5 schematically illustrates one embodiment of a controller which will compensate for the influence of the "last running" molten metal. When transfer piston or plunger 17 has completed the metal transfer operation, the length L of the sprue is a measure of the volume of the casting and this length is sensed by means of a cam 21 connected to transfer plunger 17. Cam 21 is engaged by a first cam follower 22 which adjusts the position of the tap 23A of a resistor 23 in accordance with the deviation of length L from a preselected value. Tap 23A is adjustable longitudinally of cam follower 22. Resistor 23 is incorporated in an electrical device which generates time-dependent pulses corresponding to the change of the stroke of transfer plunger 17, and which control a positioning motor 25. For this purpose, resistor 23 is connected in series with a capacitor 34 in the grid circuit of an electronic valve 35.

When a sensing element such as 18 has been retracted from receiving chamber 15 and transfer plunger 17 has reached its inward limit of movement, a contact of a multiposition stepping switch programming device 36 applies the supply voltage to positioning motor 25 controlling the cross section of the outlet of discharge pipe 13, and applies the supply voltage to the timer for motor 25. Programming device 36 may be manually operated or may be operated by a servomotor. Alternatively, the programming device 36 shown in FIG. 5 may be replaced by a contactor.

In either event, the value of resistor 23 will determine the time which must elapse until the grid potential of valve 35 has attained a value sufficient for energization of control relay 37 connected to the anode of valve 35. The contacts of relay 37 are operated to interrupt the control circuit of positioning motor 25. Thus, the time-base controlled pulses provide a conversion of sprue length L into a corresponding angular displacement of positioning motor 25. Such displacement is effected when the volume of the molten metal batch differs from the preselected value.

The direction of rotation of motor 25 is dependent on which of two switches 26 or 27 is operated by sensing device or cam 21. If the batch volume is less than the preselected value, switch 26 is closed and the control is operated to increase the batch volume. Conversely, if the batch volume exceeds the preselected value, switch 27 is operated so that the positioning motor 25 reduces the cross section of the outlet of discharge pipe 13 to reduce the "last running" of molten metal. Positioning motor 25 preferably is a double motor in which a separate armature is provided for each direction of rotation.

The completion of the working stroke of transfer plunger 17 will be indicated by an increase in pressure in the conduit supplying pressure to operate plunger 17 during its working stroke. This increase in pressure may be sensed and utilized to initiate a suitable control action of the programming device 36 to energize motor 25 and its timer. The return movement of transfer plunger 17 must not be initiated until positioning motor 25 has been deenergized after an adjustment of control valve 30. This requirement may be fulfilled by applying a stepping signal to program device 36 in response to the deenergization of motor 25.

The influence of the most important operating conditions on the amount of the "last running" of molten metal in dependence on the remaining contents of melting furnace 1 is known. To obtain equal batch volumes with maximum accuracy, a cam 29 may be provided to operate a follower control lever 28 connected to valve 30 controlling the cross section of the outlet of discharge pipe 13. Cam 29 constitutes a converter because the peripheral cam surface of cam 29 corresponds to a representation, in polar coordinates, of the variation of the controlling factors with the content of the melting furnace. As a result, the positioning movements of motor 25 are controlled in a simple manner to conform to the conditions in the melting furnace.

Cam 29 is in fixed driving connection with the output shaft of motor 25, and its cam surface is engaged by a roller on the end of lever 28, which lever is biased by a tension spring 28a against cam 25 so that lever 28 is coupled to motor 25. Lever 28 carries valve member 30 thereon, and this valve member is provided with a hand wheel 31 for presetting the valve to the desired outlet cross sections so that the flow rate of the metal can be adjusted with respect to different openings in receiving chamber 15. Depending on the deviation of the "last running" of molten metal from the desired value, valve member 30 is raised or lowered so that the cross section of the outlet of discharge 13 is controlled in a manner to cause transfer plunger 17 to perform the desired stroke in a subsequent pressure casting operation.

The peripheral cam surface of cam 29 may be designed to convert only the deviation of the stroke of transfer plunger 17 from the desired value into an appropriate control action of control valve 30, without being responsive to operating conditions in furnace 1. The apparatus for metering equal volumes of molten metal thus can be used with any melting or holding furnace irrespective of the operating conditions thereof. It should be pointed out that, when it is difficult to insert the sensing element, as when receiving chamber 15 has only a small inlet opening, metering may be effected, within an allowable tolerance range, by the controller alone.

The following considerations control the design of cam 21 and of cam 29. The valve member 30 is adjusted substantially in dependence on the surface level of the molten metal in furnace 1 and on the design of the melting or holding furnace, as well as on the sprue length L. The influence of the bath level and of the design can be mathematically ascertained. This influence can be represented in polar coordinates in the design of the cam 29. After each discharge, valve member 30 is readjusted in dependence on the lowering of the bath level. This is effected in accordance with the known relations.

To obtain a highly accurate metering, the unpredictable influences which have unknown mathematical relations are sensed as a deviation ΔL of the sprue length. This deviation is transmitted by cam 21, mounted on the rod of transfer plunger 17, to adjustable resistor 23 of the timer. Cam 21 is so shaped that an adjustment of resistor 23 in the timer causes the positioning motor 25 to effect a corresponding rotation of cam 29 in such a manner that the resulting adjustment of valve member 30 and of the outlet cross section compensates the deviation of the sprue length L. The cooperation of cam 21 with cam 29 results in an adjustment of valve member 30 by exactly the amount which, in view of the bath level, is required to compensate a deviation of the sprue length. When the bath level in the furnace is lowered, the adjustment of valve member 30 for a given deviation ΔL will be increased.

During heating of an induction furnace, the electrodynamic pressure changes the level of the metal surface so as to reduce the metered amount. The invention control apparatus is also responsive to noncontinuous influences. For a response to noncontinuous influences, particularly to the dynamic pressure, it is desirable to cause an adjustment of the control valve to increase the batch volume, in response to the operation of the furnace temperature controller 10, in equal increments, which latter depend on the electric values of the respective furnace. This may be effected by means of the reversible positioning motor 25 which, by means of cam 29 lifts control valve 30 by a certain amount when the furnace is heated and resets the valve when the furnace is deenergized.

The sensing elements enable a response to the total of the influences exerted on the batch volume. The controller, which is responsive to the stroke of the transfer plunger and takes into account the unpredictable changes in operating conditions, required only if the deviation of the amount of the "last running" of molten metal from the desired value exceeds the permissible value. On the other hand, the molten metal may be metered as a result of a cooperation of the controller responsive to the stroke of the transfer plunger with a timer for controlling the transfer pressure. This system does not include elements in direct contact with the melt, as will be described hereinafter.

Figure 6:
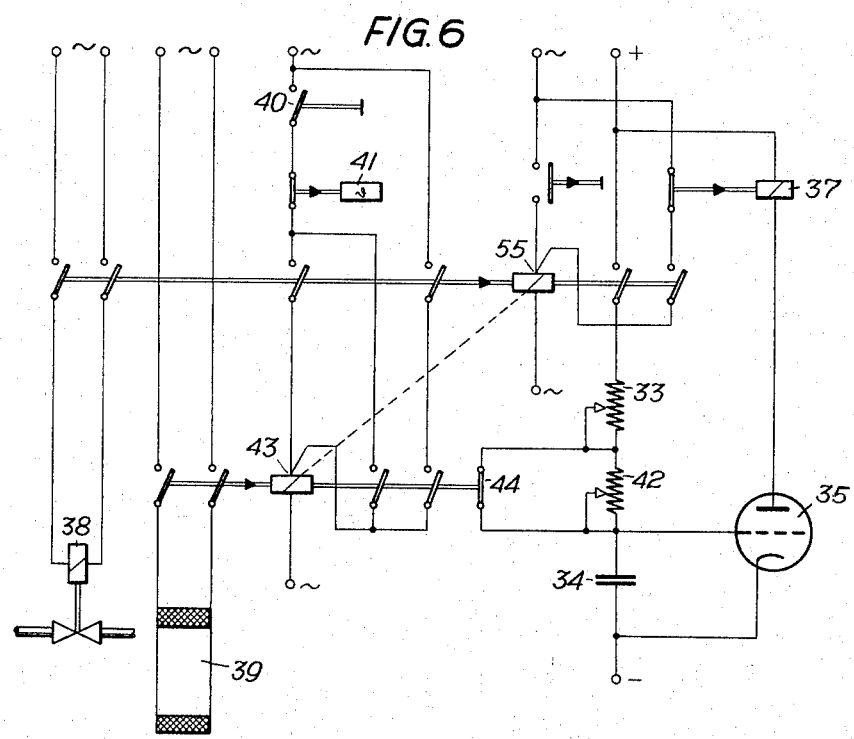
FIG. 6 is a schematic wiring diagram illustrating a timer for metering the molten metal in accordance with the invention, this timer having an adjustable time-constant and determining the time of action of the furnace pressurizing gas, with the time-constant being prolonged by a selected increment to take into account the effect of the electrodynamic pressure due to induction heating.

FIG. 6 is a circuit diagram showing a timer having an adjustable time constant, and which determines the duration of action of the pressurized gas to control the batch weight. The influence of the electrodynamic pressure, effective when the furnace is being heated, is taken into account by a corresponding prolongation of the discharge time. The timer for controlling the amount of molten metal transferred is similar in its mode of operation to the device of FIG. 5. In the control circuit of the timer, the adjusted value of resistor 33 controls the charging time of capacitor 34. The voltage across capacitor 34 is applied to the grid of valve 35. When a predetermined voltage is applied to the grid, a current flows in the anode circuit of valve 35, which includes relay 37 which causes contactor 55 to drop out when valve 35 conducts. As a result, the inlet valve 38 for the gas under pressure is closed.

A manually operable switch 40 and a temperature controller 41 are provided for controlling the induction heater 39 of the melting furnace. When the furnace is energized, the electrodynamic pressure in the feeding trough will cause molten metal to flow out at a lower rate. A resistor or potentiometer 42 can be connected in series with resistor or potentiometer 33 to prolong the metering time by a predetermined amount so that the same amount of metal is discharged into the receiving chamber of the casting machine. Resistor 42 may be short-circuited by a contact 44 of the contactor 43 which controls the induction heater.

If temperature controller 41 deenergizes or energizes heater 39 during a cycle, the constant extra time would introduce an error. For this reason, the timer which permits of a correction for the electrodynamic pressure contains means for interlocking contactor 43, controlling heater 39, with contactor 55 controlling the supply of pressurized gas so as to prevent a termination or initiation of the energization of the heater 39 while pressurized gas is being supplied to the surface of the molten metal in the melting furnace. These interlocking means are indicated in FIG. 6 by a dotted line. The added time required for compensating the electrodynamic pressure depends on the connected load value of the melting furnace. A change in the connected load (different furnace) requires a correction of the value of series resistor 42.

Figure 7:
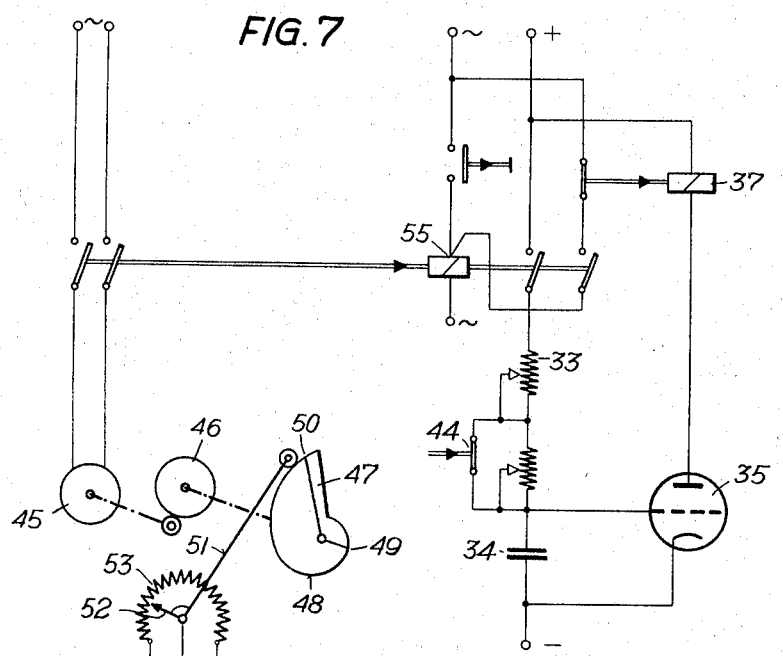
FIG. 7 is a schematic wiring diagram of a controller responsive to the change of the molten metal level in the melting furnace during the discharge operation and effective to convert such change into an adjustment of the tap of a potentiometer.

FIG. 7 is a circuit diagram showing a controller which is responsive to the variable bath level and which, by means of a converter, controls a final control element which enables a response of the discharge time to this operation condition. The time constant of the timer is selected so that a certain volume of molten metal will be discharged to the receiving chamber of the casting machine when the furnace is entirely filled with molten metal. After a few cycles, the bath level in the furnace has been lowered and with it the metered volume. This problem is related to an unpredictable change of an operating condition in the furnace.

In the embodiment shown in FIG. 7, no element of the controller is contacted by the molten metal. Those circuit components which are the same in structure and mode of operation as in FIG. 6 have the same reference characters in FIG. 7, which shows a control circuit for the grid of electron valve 35 which is similar in mode of operation to the control valve 35 in FIG. 6. A contactor 55 applies voltage to a positioning motor 45 for a preselected time during each transfer of molten metal from the furnace. Motor 45 is coupled by a speed reducer 46 to a cam 47. The peripheral face 48 of cam 47 is a representation, in a system of polar coordinates, of the level of the bath. Each discharge operation is correlated with a certain position of the cam 48. When the furnace is entirely filled with molten metal and cam 47 is set to the initial position 49, the cam will always assume the same position 50, corresponding to the lowermost bath level, when the furnace has been emptied. This will be independent of the present batch volume and of the number of discharge operations, which depends on the initial volume.

The control lever 51, which is biased against cam 47, may mechanically operate a final control element for controlling the batch volume. In a preferred embodiment of the invention, the shaft of control lever 51 is coupled to a sliding tap 52 of a potentiometer 53. Tap 52 is thus operated by positioning motor 45 through the intermediary of cam 47 and control lever 51. Potentiometer 53 may be so connected in the control circuit of a timer that the metering time is prolonged in response to the lowering of the bath level.

Figure 8:
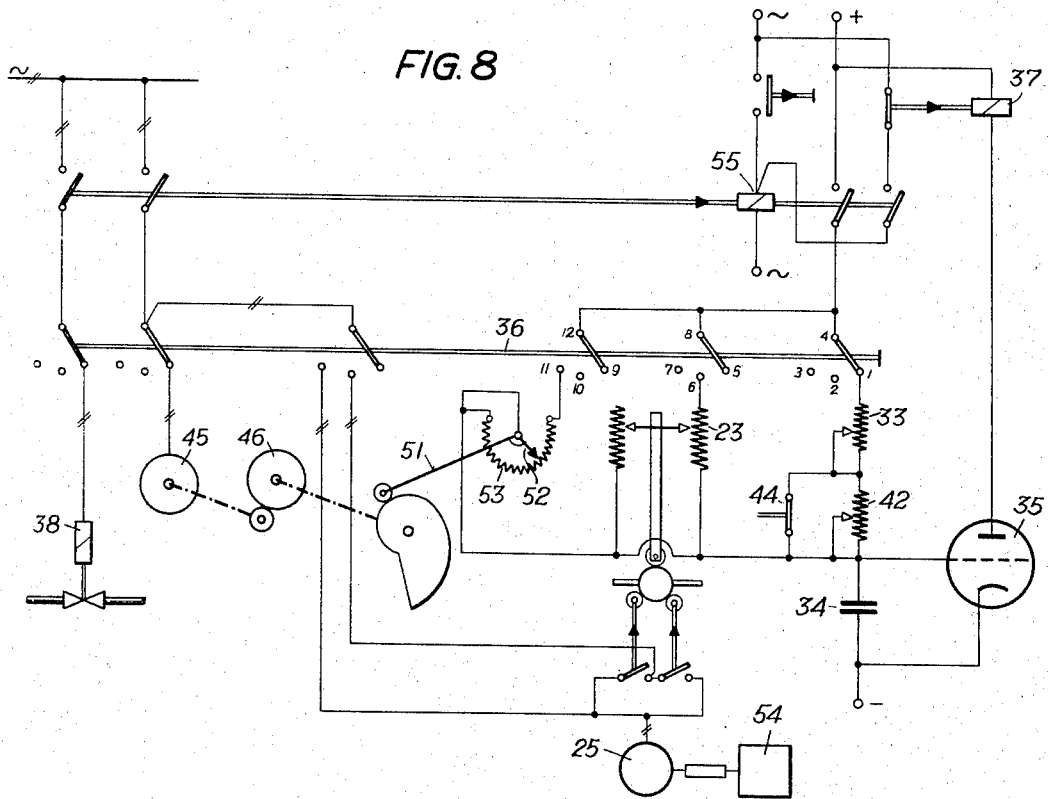
FIG. 8 is a schematic wiring diagram of a controller including a single timer, and which varies the discharge rate in response to two or more operating conditions of the furnace, which conditions are known from natural laws or which cannot be predicted.

FIG. 8 is a circuit diagram of a controller in which a single timer is used for controlling different control actions, which combine to ensure a metering of the discharge of molten metal to the desired accuracy. This controller has advantageously no components which are in direct contact with the melt. In FIG. 8, those circuit elements which have the same functions as in FIGS. 5, 6 and 7 are provided with the same reference characters.

In FIG. 8, the timer is used for successively compensating various changes in the operating conditions of the furnace. The switching is effected electrically with the aid of pilot relays or with the multiposition program switching device 36 which is controlled by a servomotor. One of the functions of the timer is to control the time during which molten metal is discharged. This time may be prolonged in accordance with the electrodynamic pressure. Another function of the same timer is to adjust the tap of a potentiometer, by a cam and a cam follower, in accordance with the amount which has been discharged from the melting furnace. In another function of the timer, the time during which molten metal is discharged can be corrected for unpredictable changes in operation conditions. A deviation of the batch volume from the desired value is sensed by a sensing means from a cam provided on the transfer plunger rod and is transferred to another potentiometer or adjustable resistor included in the control circuit. By means of a reversible positioning motor the timer operates a final control element to compensate the deviation.

Referring to FIG. 8, the time-controlling resistors have the following functions. Adjustable resistor 33 determines the time during which molten metal is discharged. Resistor 42 is short-circuited by contact 44 when the furnace is deenergized. Resistor 53 is adjusted by positioning motor 45, through cam 48 and cam follower 51, in accordance with the change of the bath level and serves for converting this regular change of the operating conditions into a time during which motor 25 is operated to adjust a final control element 54 for controlling the metered volume. Element 54 may be a reducing valve controlling the supply of pressurized gas. Through the medium of the sensing means operated by the cam on transfer plunger 17, resistor 23 is adjusted in response to a deviation of the batch volume from the desired value, and supplies, to positioning motor 25, a correcting signal having a suitable polarity for compensating the deviation.

The controller shown in FIG. 8 and serving to control the discharge of equal volumes of molten metal meets the metallurgical requirements and ensures a high metering rate. With the exception of the discharge pipe, no components contact the melt or protrude into the furnace so that the system according to the invention is highly reliable in operation. In the controller, the timer acts as a transducer which, in response to the connected load value of the furnace, the molten metal remaining in the furnace and the deviation of the batch volume from the desired value determines the energization time or the magnitude of one or more final control elements which control the discharge of the molten metal.

Figure 9:
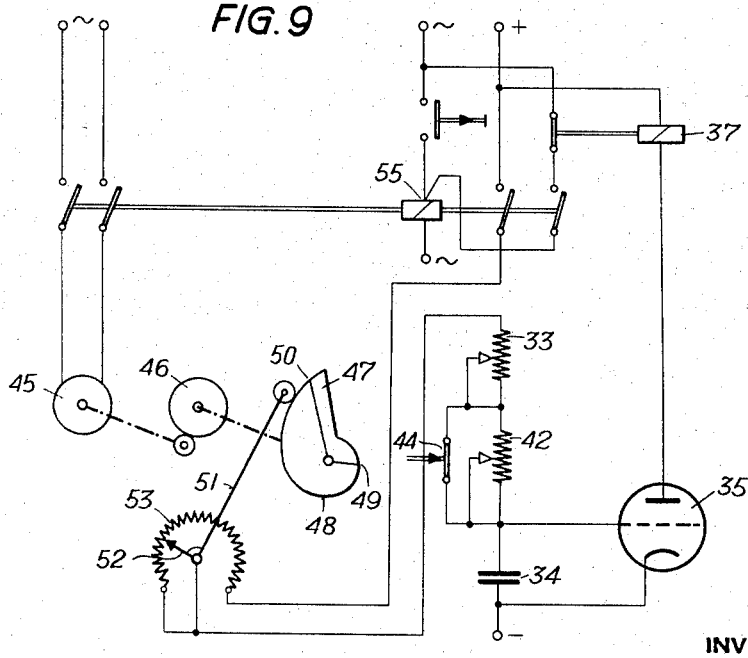
FIG. 9 is a wiring diagram illustrating a modification of the wiring diagram of FIG. 7.

FIG. 9 shows a further embodiment of the invention, in which the same reference characters as in FIG. 7 have been used for like parts. The control circuit of a timer includes, in series with potentiometer 53, a resistor 33, which is adjustable to the preselected batch volume, and a resistor 42, which serves for compensating the effect of the electrodynamic pressure on the discharge rate. The position of the tap of potentiometer 53 depends on the bath level in the furnace.

When molten metal is to be discharged from a furnace in which it is held at a constant temperature ready for casting, metallurgical disadvantages, and means which are not satisfactory as far as their readiness for operation is concerned, can be avoided by the present discharge apparatus by the use of an electrical control system, in which a timer operates one or more final control elements for metering, and including a controller, which is indirectly responsive to the deviation of the batch volume and controls the metering so as to ensure a constant discharge volume of liquid metal. A high metering accuracy is obtained by the operation of one or more final control elements in dependence on factors having a known magnitude and influence on the volume for each discharge operation, and by taking into account further factors which also cause a change of the volume being discharged, but which cannot be foreseen in occurrence and magnitude. A deviation from the desired batch volume due to such factors, and a cumulative error which occurs during the correction of factors of the first kind, will be eliminated in that any deviation causes a final control element to be operated so that the error will no longer occur during the subsequent discharge operations.

The expenditure involved in a practical embodiment will depend on the specific use and on the required accuracy. Normally, the known influences exerted by the operating conditions of the melting furnace on the metering due to natural laws will be taken into account as well as those influences which cannot be predicted. There are applications, however, where it is sufficient to take into account only influences of one kind or of the other. The design of the means for sensing and responding to the influences of the operating conditions will also depend on the desired metering accuracy. The means for correcting the batch volume may act on different final control elements or jointly on a single final control element.

The apparatus according to the invention has the advantage that the batch volume can be selected in a simple manner and within wide limits, and may be held constant with high accuracy independently of outer influences. The melting furnace may be of any selected type. More particularly, the apparatus may be used in conjunction with a two-chamber, induction channel furnace. Existing furnaces may also be provided with the apparatus according to the invention. The flow rate of the discharge jet may be adjusted for receiving chambers of different sizes and the formation of oxide during the casting operation is minimized. There is no temperature loss of the molten metal while it is being fed to the pressure casting machine, and sensitive parts, such as the float, valves and contacts are not permanently exposed to the molten metal.

External influence which cannot be foreseen, such as a change of the outlet cross section by a deposition of oxide or by a spalling of refractory material, a change in the discharge rate owing to fluctuations in voltage or pressure, or a change of the specific volume due to differences in temperature and alloy composition, will be automatically sensed and corrected by the apparatus according to the invention.

The apparatus for controlling a discharge of constant, adjustable amounts of metal compensates the changes in the discharge rate which are caused by the changing electrodynamic pressure in induction-heated melting furnaces.

While specific embodiments of the invention have been shown and described in detail to illustrate the application of the principles of the invention, it will be understood that the invention may be embodied otherwise without departing from such principles.

What is claimed is:

1. A casting plant comprising, in combination, a furnace adapted to contain molten metal; a pressure casting machine including a transfer plunger operating in a shot chamber, combined with a receiving chamber adapted to receive molten metal from said furnace, the position of said plunger at the end of its working stroke varying with the batch volume of the molten metal; measuring means for fixing the batch volume of metal destined to be transferred to said receiving chamber from said furnace; means, including a discharge control valve, controlling transfer of molten metal from said furnace to said receiving chamber; means for measuring any deviation of the batch from a preselected value; and compensating means operatively associated with said measuring means and operable to vary the volume of the succeeding batch to compensate for said deviation.

2. A casting plant, as claimed in claim 1, in which said measuring means includes level sensing means sensing the level of molten metal in said receiving chamber.

3. A casting plant comprising, in combination, a furnace adapted to contain molten metal; a casting apparatus including a transfer plunger operating in a shot chamber combined with the receiving chamber adapted to receive molten metal from said furnace; means, including a discharge control valve, controlling transfer of molten metal from said furnace to said receiving chamber; means, including a controller, operable to close said valve responsive to transfer of a preselected volume of metal to said receiving chamber; and means operable to retract said level sensing means from said receiving chamber prior to transfer of the molten metal from said receiving chamber to a mold included in said casting apparatus, said retraction of said level sensing means clearing said level sensing means from the path of said transfer plunger.

4. A casting plant, as claimed in claim 3, including a shield of heat-resistant material positioned in said receiving chamber close to said level sensing means and dividing said receiving chamber into a relatively large section, arranged to receive molten metal directly from said furnace, and a relatively small section, containing said level sensing means; said sections communicating in the lower portion of said receiving chamber; said shield being connected to said level sensing means for conjoint retraction therewith from said receiving chamber.

5. A casting plant, as claimed in claim 2, in which said level sensing means includes a float of heat-resistant material operating a switch in a control circuit of said measuring means.

6. A casting plant, as claimed in claim 2, in which said level sensing means includes an electrode which, upon contact with the surface of the molten metal in the receiving chamber, closes a control circuit included in said measuring means.

7. A casting plant uomprising, in combination, a furnace adapted to contain molten metal; a pressure casting apparatus including a transfer plunger operating in a shot chamber combined with the receiving chamber adapted to receive molten metal from said furnace; means, including a discharge control valve, controlling transfer of molten metal from said furnace to said receiving chamber; means, including a controller, operable to close said valve responsive to transfer of a preselected volume of metal to said receiving chamber; a timer included in said controller and controlling closing of said discharge valve; said furnace being an induction furnace; said timer including a capacitor, an electronic switch, circuit means for applying the voltage across said capacitor as a control voltage to said electronic switch, an adjustable first resistor adjustable in accordance with the desired batch volume of molten metal, and a second resistor selectively connectable in series with said first resistor to compensate the effects of the electrodynamic pressure on the discharge rate of metal when said furnace is energized; said first resistor and said capacitor being connected in a timing circuit; the position of said transfer plunger, at the end of its working stroke, varying with the batch of volume of the molten metal; and means operatively associated with said plunger and said first resistor and operable to adjust said first resistor in accordance with the position of said plunger.

8. A casting plant, as claimed in claim 1, in which said controller includes a timer controlling closing of said discharge control valve; said timer including a capacitor, an electronic switch, means for applying the voltage across said capacitor as a control voltage to said switch and a variable resistor connected in a timing circuit with said capacitor; and means operable to adjust said resistor in accordance with the surface level of molten metal in said furnace.

9. A casting plant, as claimed in claim 8, in which said resistor includes an adjustable tap; a positioning motor connected to said tap to adjust the same; and a second timer operable to energize said positioning motor for a predetermined time interval after each batch of molten metal has been transferred.

10. A casting plant comprising, in combination, a furnace adapted to contain molten metal; a pressure casting apparatus including a transfer plunger operating in a shot chamber combined with the receiving chamber adapted to receive molten metal from said furnace; means, including a discharge control valve, controlling transfer of molten metal from said furnace to said receiving chamber; means, including a controller, operable to close said discharge control valve responsive to transfer of a preselected volume of metal to said receiving chamber; said controller including a timer controlling closing of said discharge control valve; said furnace being an induction furnace; the position of said transfer plunger, at the end of its working stroke, varying with the batch volume of molten metal; said timer comprising a capacitor, an electronic switch, means for applying the voltage across the capacitor as a control voltage to said switch, an adjustable first resistor adjustable in accordance with the desired batch volume of molten metal, a second resistor selectively connectable in series with said first resistor to compensate in series with said first resistor to compensate the effects of the electrodynamic pressure on the discharge rate of molten metal when said furnace is energized, a third resistor, a fourth resistor, and a stepping switch operable to connect selectively said first resistor, said third resistor and said fourth resistor, one at a time, in a timing circuit including said capacitor; means operatively associated with said plunger and said third resistor and operable to adjust said third resistor in accordance with the position of said plunger; and means operable to adjust said fourth resistor in accordance with the surface level of the molten metal in said furnace.

11. A casting plant, as claimed in claim 10, including a programming device operating said stepping switch.

12. A casting plant, as claimed in claim 10, including a source of gas under pressure; said discharge control valve controlling communication between said source and said furnace.

13. A casting plant, as claimed in claim 10, in which said discharge control valve is a reducing valve; and a positioning motor adjusting said valve; said timer controlling the energization time of said motor.

14. A casting plant comprising, in combination, a furnace adapted to contain molten metal; a pressure casting machine including a transfer plunger operating in a shot chamber combined with a receiving chamber adapted to receive molten metal from said furnace; means, including a discharge control valve, controlling transfer of molten metal from said furnace to said receiving chamber; means, including a controller, operable to close said discharge control valve responsive to transfer of a preselected volume of metal to said receiving chamber; sensing means operable to sense the batch volume of molten metal in said receiving chamber; and compensating means operatively associated with said sensing means and operable to vary the volume of the succeeding batch to compensate for any deviation of the volume of the preceding batch from a preselected value.

15. A casting plant, as claimed in claim 14, in which said casting apparatus comprises a pressure casting machine including a transfer plunger whose position, at the end of its working stroke, varies with the batch volume of molten metal in said receiving chamber; said volume sensing means sensing the final working stroke position of said press plunger.

16. A casting plant, as claimed in claim 15, including a first cam comprised in said volume sensing means and connected to and movable with said transfer plunger; a positioning motor including an output shaft; said compensating means including a second cam driven by said output shaft, a pivoted control lever having a free end engaging said second cam and coupled to said discharge valve, and manually operable means for adjusting said discharge control valve relative to said control lever to preset a desired batch volume of molten metal; said volume sensing means comprising means, including cam followers, operatively engaged with said first cam and effective to deenergize said positioning motor to perform an angular movement having an amplitude and direction such as to compensate said deviation.

17. A casting plant, as claimed in claim 16, in which said cam constitutes a solid of revolution symmetrically increasing in diameter from its ends to its longitudinal center line; a potentiometer having an adjustable tap; there being plural cam followers operatively associated with said cam; one of said cam followers being connected to said tap to adjust the same; a capacitor connected with said potentiometer in a time determining circuit controlling energization of said positioning motor; two further cam followers controlling the direction of energization of said motor in dependence on the direction of said deviation.

18. A casting plant, as claimed in claim 16, in which said second cam constitutes a converter representing, in polar coordinates, the variation of controlling factors.

19. A casting plant, as claimed in claim 16, including a transfer valve connected between said furnace and said receiving chamber and adjustable by said positioning motor.

20. A casting plant, as claimed in claim 19, in which said furnace is an induction furnace; and temperature responsive control means controlling said motor responsive to the temperature of the molten metal in said furnace to increase the opening of said transfer valve when said furnace is energized.

References Cited

UNITED STATES PATENTS

| | | | |
|---|---|---|---|
| 3,252,619 | 5/1966 | Miller | 222—52 X |
| 2,356,013 | 8/1944 | Spooner | 164—156 |
| 2,660,769 | 12/1953 | Bennett | 164—156 |
| 2,700,737 | 1/1955 | Holmes et al. | 164—154 XR |
| 2,741,006 | 4/1956 | Kux | 164—156 |
| 3,302,253 | 2/1967 | Moriyama | 164—154 |
| 3,306,964 | 2/1967 | Miller | 18—30 |

FOREIGN PATENTS

| | | |
|---|---|---|
| 678,949 | 6/1939 | Germany. |
| 648,788 | 1/1951 | Great Britain. |

J. SPENCER OVERHOLSER, *Primary Examiner.*

R. S. ANNEAR, *Assistant Examiner.*